Patented Apr. 10, 1945

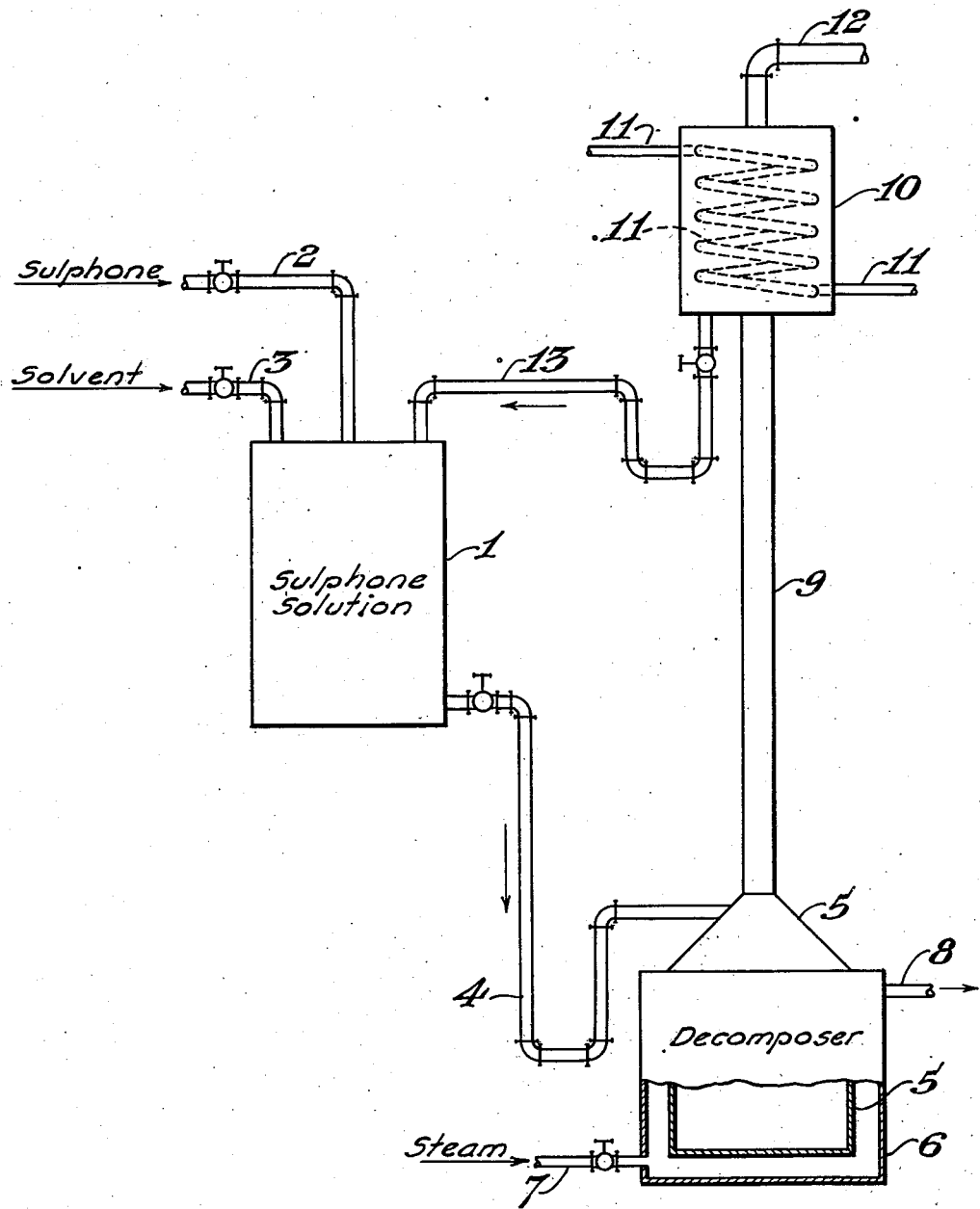

2,373,563

UNITED STATES PATENT OFFICE 2,373,563

DECOMPOSITION OF DIOLEFIN SULPHONES

George W. Hooker and Stephen C. Stowe, Midland, Mich., assignors to The Dow Chemical Company, Midland, Mich., a corporation of Michigan Application August 18, 1939, Serial No. 290,863

6 Claims. (Cl. 260—681)

This invention concerns an improved method of decomposing the sulphones of conjugated diolefins, particularly of butadiene and isoprene, to recover the diolefin and sulphur dioxide components thereof.

One of the known methods for separating conjugated diolefins such as butadiene-1.3 or isoprene from cracked-oil gas or other hydrocarbon mixtures containing them involves the steps of treating the hydrocarbon mixture with liquefied sulphur dioxide or a solution of sulphur dioxide in water or other inert solvent to form a crystallizable sulphone of the diolefin. The sulphone is separated from the other components of the reaction mixture and heated, usually at temperatures above 120° C., to decompose it and regenerate the diolefin and sulphur dioxide. The mixture of diolefin and sulphur dioxide is preferably cooled quickly, e. g., by passage through cooling devices, and the sulphur dioxide is removed by neutralization with an alkali or by scrubbing with water or other solvent, to recover the diolefin in substantially pure form.

In the large scale production of purified butadiene from cracked-oil gas by the known method just described, serious operating difficulties have been encountered in decomposing the sulphone to recover the butadiene and sulphur dioxide. The sulphone is either entrained or sublimed into, or is re-formed within, the vapor lines and cooling device leading from the decomposing chamber. It accumulates in the lines and/or cooler, thus interfering with the vapor flow and preventing efficient cooling of the vapors, and eventually causes stoppage. Furthermore, in heating a commercial sized batch, e. g., 5 gallons or more, of the sulphone to decomposition, careful temperature control is required in order to avoid local overheating with resultant tar formation. The partial stoppage of gas flow due to the accumulation of sulphone in the vapor lines and cooling device leading from the decomposing chamber renders accurate temperature control difficult. An object of this invention is to provide a simple efficient method of decomposing diolefin sulphones which avoids such difficulties and permits recovery of the purified diolefin in excellent yield.

We have discovered that local overheating of the reaction mass may be avoided and accumulation of the sulphone in vapor lines, coolers, etc., may be prevented by dissolving the sulphone in an inert volatile solvent and heating the solution, preferably under a reflux of the solvent, to the temperature necessary for decomposition of the sulphone.

The accompanying drawing is a diagrammatic sketch showing a preferred arrangement of apparatus for use in practicing the invention. In the drawing the numeral 1 designates a sulphone solution storage tank which is provided with an inlet 2 for the sulphone and an inlet 3 for a solvent. A conduit 4 leads from the lower portion of storage tank 1 to a decomposing chamber 5 which may be provided with a heating jacket 6 having the inlets 7 and 8 for a heating fluid, such as steam, diphenyl oxide, mineral oil, etc., as shown, or may be heated in any other desired manner. A vapor line 9, which may be cooled, if desired, leads from the top of chamber 5 to a condenser 10 above said chamber, i. e., at an elevation higher than chamber 5. The condenser 10 has a cooling coil 11 passing therethrough and is provided at its top with a vapor outlet 12. A valved conduit 13 leads from the bottom of condenser 10 to the storage tank 1 and permits a portion of the condensate to drain back into the storage tank.

In producing a diolefin and sulphur dioxide by decomposition of a corresponding sulphone with apparatus such as that shown in the drawing, the sulphone and sufficient volatile inert solvent to dissolve the same and form a mobile solution are charged into the storage tank 1. Any volatile solvent which is non-reactive with the sulphone and its decomposition products and which boils at a temperature above the boiling points of sulphur dioxide and of the diolefin produced by decomposition of the sulphone may satisfactorily be used. When operating at atmospheric pressure, the solvent should, of course, have a boiling point above the decomposition temperature of the sulphone. However, by operating at superatmospheric pressure solvents of lower boiling point may satisfactorily be used. Examples of solvents which may be employed are benzene, chlorobenzene, toluene, xylene, and other alkylated benzenes, diphenyl oxide, petroleum ether, kerosene, etc.

The sulphone solution is permitted to drain gradually into the decomposing chamber 5 which is heated sufficiently to decompose the sulphone and cause reflux of the solvent within the condenser 10. The vapor mixture of solvent, sulphur dioxide, and diolefin produced by this heating operation pass through vapor line 9 into the condenser 10 which is cooled sufficiently to condense the solvent. The solvent thus condensed drains in part back through conduit 9 into chamber 5 and in part through conduit 13 into the storage tank 1. It dissolves and removes from conduit 9 and condenser 10 any sulphone which might otherwise tend to accumulate therein. The residual vapor mixture of sulphur dioxide and diolefin passes from the system through outlet 12 which leads to conventional apparatus for removing the sulphur dioxide and thus recovering the purified diolefin. Such removal of sulphur dioxide from the vapor mixture may be accomplished in any of several ways, e. g., by passing the mixture through caustic soda or other alkali, or through an aqueous solution of such alkali, or by scrubbing the vapors with water or other solvent capable of dissolving the sulphur dioxide, but not the diolefin. A number of ways for effecting this removal of sulphur dioxide are well known. During operation, as just described, the solvent for the sulphone is continuously recycled in the system, but the purified diolefin is removed and collected. The sulphur dioxide may be removed or re-utilized for the preparation of additional sulphone, as desired. Accordingly, once operation is started, the introduction of solvent into the system may be discontinued, but the sulphone may be fed in continuously to produce a steady output of purified diolefin.

It will be apparent that the operating procedure and the equipment described above may be altered without departure from the invention. For instance, in recovering butadiene from cracked-oil gas the latter may be treated with sulphur dioxide in the presence of a solvent for the butadiene sulphone, thus forming directly a solution of the sulphone. The unreacted components of the cracked-oil gas may be vented and the sulphone solution may be passed directly to a decomposing chamber where it is heated under reflux of the solvent to a temperature sufficient for decomposition of the sulphone. The solvent reflux prevents accumulation of sulphone in the vapor lines leading from the decomposing chamber and thus permits direct production of the purified diolefin without any operating difficulties. By operating as just described, butadiene of greater than 99 per cent purity has been recovered from cracked-oil gas fractions comprising the same in yields exceeding 95 per cent of theoretical.

Although the decomposition of a sulphone in the presence of a solvent is preferably carried out so as to reflux the solvent in the vapor line leading from the decomposing chamber and thereby keep the line free of sulphone, such reflux is not essential. The presence of the solvent during the decomposition reduces greatly the amount of sulphone carried into the vapor line and permits continuous operation over a longer period of time without plugging of the vapor line occurring than is possible when decomposing the sulphone in the absence of the solvent under otherwise similar conditions. During operation in such manner, solvent may occasionally be injected into the vapor line to dissolve and remove any sulphone accumulated therein. The equipment is preferably arranged so that the solvent used to wash the vapor line will drain into the decomposing chamber. If desired, the high boiling solvent may, during operation, be pumped continuously from the decomposing chamber to the vapor cooler and be permitted to drain through the vapor line back into the decomposing chamber, thus keeping the cooler and vapor line free of sulphone. The invention may be applied in separating any conjugated diolefin, e. g., a conjugated pentadiene or conjugated hexadiene, from hydrocarbon mixtures comprising the same. For instance, it may be applied in decomposing the sulphones of diolefins such as 2.3-dimethyl butadiene, 2-ethyl butadiene, etc., to recover the purified diolefins in excellent yield.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. The method which comprises heating a solution of a sulphone of a conjugated diolefin and a volatile inert solvent therefor under reflux of the solvent to a temperature at which the sulphone is decomposed with formation of sulphur dioxide and the diolefin.

2. The method which comprises heating a solution of butadiene sulphone and an inert volatile solvent therefor under reflux of the solvent to a temperature at which the sulphone is decomposed with formation of butadiene and sulphur dioxide.

3. The method which comprises heating a solution of isoprene sulphone and an inert volatile solvent therefor under reflux of the solvent to a temperature at which the sulphone is decomposed with formation of isoprene and sulphur dioxide.

4. The method which comprises heating a solution of a sulphone of a conjugated diolefin and a volatile inert solvent therefor under reflux of the solvent to a temperature at which the sulphone is decomposed with formation of the diolefin and sulphur dioxide, cooling the resultant vapor mixture sufficiently to condense the solvent, and treating the residual mixture of sulphur dioxide and diolefine to remove the sulphur dioxide and recover the diolefin.

5. The method which comprises treating a hydrocarbon mixture comprising a conjugated diolefin with sulphur dioxide to form a crystallizable sulphone of the diolefin, dissolving the sulphone in a volatile inert solvent therefor, heating the resultant solution under reflux of the solvent to a temperature at which the sulphone is decomposed with formation of the diolefin and sulphur dioxide, cooling the resultant vapor mixture sufficiently to condense the solvent, and treating the residual vapors to remove sulphur dioxide therefrom and recover the diolefin.

6. The method which comprises dissolving a sulphone of a conjugated diolefin in a volatile inert solvent therefor, passing the solution into a heating zone wherein it is heated under reflux of the solvent sufficiently to decompose the sulphone into the diolefin and sulphur dioxide, continuously venting vapors from the reaction zone, cooling the vented vapors to condense solvent therefrom, dissolving additional sulphone in the condensate, and introducing the resultant solution into the heating zone.

GEORGE W. HOOKER.
STEPHEN C. STOWE.